INVENTORS
WILLIAM A. KEUTGEN
CHARLES R. DAVALL
RUPERT S. DANIELS

BY
ATTORNEY

140 X

140 X

United States Patent Office 2,976,574
Patented Mar. 28, 1961

2,976,574

CHEMICAL PROCESS AND PRODUCT

William A. Keutgen, Martinsville, Charles R. Davall, Somerville, and Rupert S. Daniels, Union, N.J., assignors to Union Carbide Corporation, a corporation of New York Filed July 31, 1956, Ser. No. 601,137

8 Claims. (Cl. 18—48)

This invention relates to a method for making unique spheroids of reduced size from fusible resins. It relates more particularly to the production of heat-rounded minute spheres possessing unusual gravity-flow properties by a substantially deglomerative, turbulent gas flow process from powdered resinous phenol-aldehyde condensation products.

These minute spheres, hereinafter referred to as microspheres, have proved to be of particular value in the preparation of abrasive structures, wherein they are employed as a resin bond. Synthetic resin bonded abrasives are manufactured today by a process wherein the abrasive grit is mixed with a liquid wetting agent such as furfural or a liquid phenol-formaldehyde resin so as to thoroughly coat it. A powdered solid resin is then mixed in so as to adhere to the coated grit. In this way a dry easy flowing mix is formed which distributes itself uniformly in the mold. Nevertheless, under pressure in the cold mold, it becomes sufficiently tacky to adhere together and hold its shape after removal from the mold and during the heat hardening step.

A difficulty has been encountered in the use of the process, however, since it necessitates the use of a long time heating cycle at slowly increasing temperatures to cure the abrasive structures. If this is not done, voids, blisters and distortion result from the too rapid volatilization of all or part of the solvent or liquid resin. The curing process is therefore unduly time consuming.

The powdered solid resins commonly used industrially as bonding agents for example, in abrasive structures, fiber batts and brake linings consist of particles which normally range in size from 2 to 200 microns in diameter. The individual pulverized resin particles are irregular in shape and the surface area and powder density is dependent on the fineness of grind. A finer grind causes an increase in surface area and a decrease in powder density.

It has been discovered that when such standard pulverized resins are first heat rounded or polished according to the turbulent gas flow process to be described herein and before they are incorporated in an abrasive mixture, the amount of wetting required can be considerably reduced and yet sufficient adherence of the heat polished solid dry resin to the grit still be had to yield a satisfactory abrasive mixture. Moreover, such a mixture is more readily flowable than a mix made with standard powdered resin. Since less liquid wetting agent is required, there is less danger of blister and void formation. As a result a stronger abrasive article can be produced and the curing cycle can be accelerated with consequent speed-up of production.

Grinding wheels incorporating the phenolic resin microspheres of the present invention possess an increased safety factor due to their increased resistance to centrifugal forces tending to cause a rotating abrasive wheel to fly apart, a substantial diminution in the tendency to break under shock, and a resistance to fragmentation.

Not only in the use of the abrasive products of the present invention is the safety factor increased but also in the manufacture of these articles, for the dust explosion hazard is markedly reduced employing phenolic resin microspheres from that present when a pulverized phenolic resin, which has much greater surface area per unit weight, is employed.

In addition, abrasive mixtures containing polished microspheres are more adaptable to continuous automatic operations, as well as undergoing a better bonding with a shorter curing period. This is due to the fact that it is possible, using microspheres to introduce in the abrasive mix a higher ratio of microspheres to wetting agent than can be employed with standard powdered resin.

In addition the abrasive mixture made with our polished microspheres is considerably drier than a standard abrasive mixture and is more adaptable to continuous automatic operations.

A further object of the present invention is to provide a non-agglomerating phenol-aldehyde resin powder capable of being uniformly distributed by gravity from a vibrating trough on to a moving surface. Standard powdered phenol-aldehyde resins exhibit poor gravity flow properties and tend to bridge over in hoppers and meter poorly from vibrating troughs, thus preventing uniform distribution.

Other improvements resulting from this invention are the ability to pack a greater weight of heat rounded smooth microspheres in a given container because of their greater powder density. Despite this greater density, however, these resins also display a greater resistance to sintering than the standard pulverized resin.

According to one heretofore disclosed procedure a liquid mixture of a resinoid and water or a melted resinoid is sprayed into a current of hot air to secure removal of the moisture content and other volatile impurities while in a finely divided condition. By so doing, dehydration of the resinoid is also obtained and while in a finely suspended condition falls freely through a warm air zone to the bottom of the cylinder where it may meet a gentle current of cool air. It is necessary, in order to effect removal of moisture and dehydration, to maintain consistently higher temperatures, in the warm air zone than would be required in forming spheroids from a dry powered resin, thus increasing the incidence of agglomeration and adhesion to the walls of the pelletizing container. Further this process provides neither a deglomerated dry powdered resin entering the warm air zone, nor does it teach such a turbulent air flow as would prevent, substantially, the adherence of the resin particle from the walls of the gas-flow chamber wherein the spherical pellets are to be formed.

Still other procedures are taught for producing spherical pellets, although not disclosing resinous materials generally. In the practice of one of these methods, particles of glass, or a similar material, are permitted to fall freely from a container into a flame, or heated current wherein the particles are entrained, melted and passed into a chamber while cooling and becoming hardened, no turbulent cooling zone being present. According to another of these processes, a free fall may be afforded the particles through a warm and a cold air zone, the warm zone being heated from outside the zone container by a suitable heating device. Neither of these procedures, however, employs turbulent gas zones, as such, nor do they teach a deglomerative introduction of the particles to be formed into spheres into the warm and cold gas zones. The substitution of liquids of lesser specific gravity than the powdered material to be treated, in the warm and cold zones for the gaseous media, has also been suggested. However, the employment of liquid media effects a radical reduction in the degree of turbulence as well as requiring an additional drying step.

The present invention involves a method of propelling and dispersing into a mixing chamber dry, ground, fusible phenol-aldehyde resin particles of the resole or novolak type, preferably by means of a cool, turbulent substantially inert gas feed, such as air, functioning at a temperature substantially below the melting point of the said resin. The resin is introduced into this latter chamber at one end thereof, at which point the said particles are entrained in a hot turbulent substantially inert gas stream above the melting point of the resin and heat rounded or polished by surface tension. The microspheres so formed usually range in size from approximately 5 to 200 microns in diameter and preferably at least 90 percent of the microspheres vary in diameter from 15 to 200 microns. These spheres pass to the periphery and opposite end of the mixing chamber where a cool, turbulent substantially inert gas of a temperature substantially below the melting point of said resin is supplied to said chamber and entraining and cooling said spheres therein to form fusible, rounded microspheres, and withdrawing said microspheres and said intermixed hot and cool gases through a common port from said mixing chamber.

The terms "phenol-aldehyde condensation product" and "phenol-aldehyde resin" as employed throughout this specification refer to acid or base catalyzed heat-hardenable resins of the resole or novolak type, such as are described in U.S. Patents 2,585,196 to Walton; 2,475,587 to Bender et al.; 2,557,922 to Mazzucchelli et al.; 2,617,785 to Pritchett et al.; 2,675,335 to Rankin et al. and 2,552,025 to Barr et al. These terms are also intended to include heat-hardenable phenol-aldehyde resins modified with up to 20 percent and preferably 10 percent to 20 percent of thermoplastic resins such as polymerized vinyl ethers and vinyl esters, for example, polyvinyl acetate, polyvinyl chloride and copolymers of vinylidene chloride and vinyl chloride, partial acetals of polyvinyl alcohol such as the partial formaldehyde or butyraldehyde acetal of hydrolyzed polyvinyl acetate, and polystyrene and copolymers thereof with other compatible polymerizable compounds. By a heat-hardenable resin is meant a resole resin which is heat-hardenable per se or a novolak resin which becomes so upon the addition of a methylene engendering agent.

Thus if the microsphere are of the novolak type of phenol-aldehyde resin they must be mixed with sufficient methylene containing hardening agent e.g. hexamethylene tetramine, paraformaldehyde or formaldehyde, to render them infusible when heated to the elevated temperatures required for producing various abrasive articles such as grinding discs and wheels, as is known to the art. Alternatively the engendering agent can be added to the particulate resin prior to the formation of the microspheres or upon addition of the modifying resin, in which latter instance, for example, an excess of engendering agent can be introduced into the modifying resin prior to its addition to the phenol-aldehyde resin particles.

Fig. 1 in the drawings is a schematic side elevation of the preferred apparatus set-up suitable for the practice of the invention.

Figure 1:
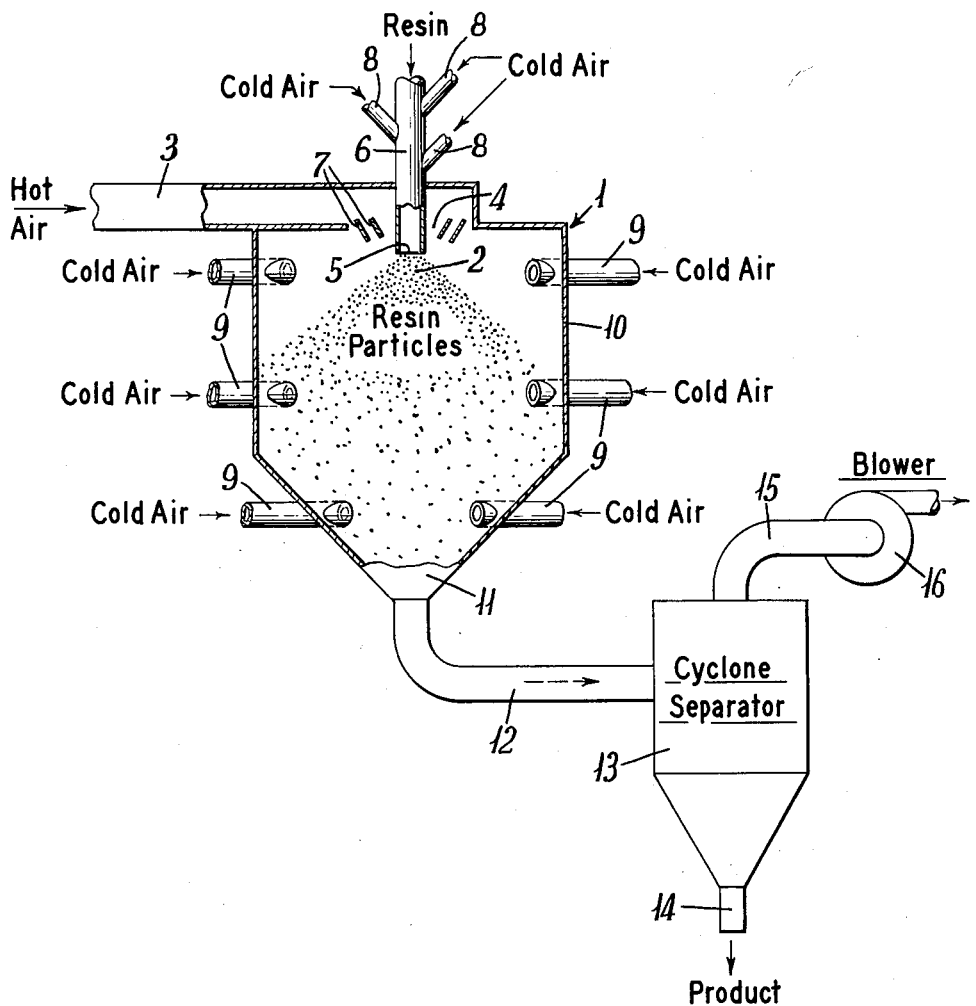

Referring more particularly to Figure 1, the apparatus comprises a mixing chamber 1, wherein the resin particles 2 are melted by a hot air stream passed at a temperature ranging preferably from 300° F. to 500° F. or about 100° F. to 150° F. above the fusing point of the resin from a furnace (not shown) and emerging from the hot air conduit 3 the annular opening 4 of which is coaxially disposed about the resin feed port 5 of the resin particle conveyor tube 6 at the top central portion of said mixing chamber 1. Vanes 7 in this annular orifice 4 impart a circular motion to the hot air entering the chamber 1 and produce a turbulent condition just below the said resin feed port 5. The particle conveyor tube 6 also has disposed along its side walls at regular intervals, cold air jets 8 for effecting turbulent deglomeration and propulsion of the ground resin particles by emission of cool air into the resin conveyor tube 6. Sufficient cool air preferably at a temperature of 40° F. to 90° F. should be introduced such that the temperature of the outlet air is 20° F. to 30° F. below the melting point of the resin particles. The pulverized resin may be fed to this conveyor tube 6 from a vibratory trough feeder wherein the resin particles are deposited subsequent to grinding of the resin to the desired particle size, normally 2 to 200 microns in diameter, and prior to their introduction into the aforesaid conveyor tube 6 at a controlled rate of speed. A plurality of compressed air lines 9 are also provided along the periphery of the mixing chamber for the introduction of cool air therein. These air lines 9 are so adjusted that the air entering the chamber 1 does so tangentially to the wall thereof and in counterrotation to the flow of warm air about the resin feed port 5, thus continuing the turbulent pattern of air movement in the mixing chamber. In this manner the melted resin particles formed into microspheres in the hot zone by virtue of surface tension, are maintained in a dispersed phase while congealing in the peripheral and lower cool zone, accomplishing a two-fold purpose by preventing agglomeration as well as adherence of the microspheres to the side walls of the mixing chamber 1. The configuration of this latter chamber may be that of an upright cylinder 10 with a conical bottom section 11 which tapers to form the entrance to conduit 12 by which passage the fusible microspheres are transported to the cyclone separator 13, from the bottom of which the product microspheres are withdrawn through the product conveyor tube 14. Disposed externally to said cyclone separator 13, and communicating therewith through air conduit 15, is a blower 16 for the purpose of drawing air through the entire system hereinabove described.

Figure 2:
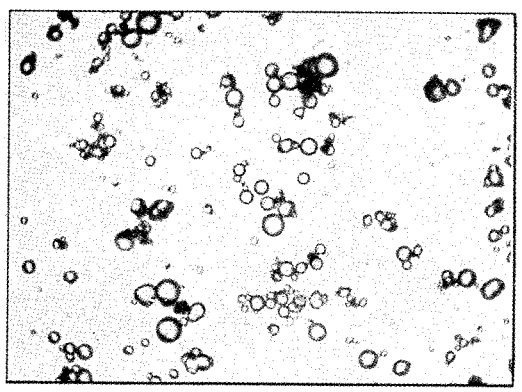
Fig. 2 is a photomicrograph of the resin microspheres obtained by the process of the present invention.

Fig. 2 is a photomicrograph showing the resin microspheres obtained by the herein described process enlarged 140 times. The microspheres depicted are in the range of 5 to 40 microns in diameter.

Figure 3:
Fig. 3 is a photomicrograph of the standard pulverized ground resin particles shown for purposes of comparison.

Fig. 3 shows, for purpose of comparison, the standard pulverized ground resin particles currently employed in the production of abrasive articles, fiber batts and the like, and ranging in size from 2 to 65 microns in diameter. The photomicrograph shows these particles enlarged 140 times.

Figure 4:
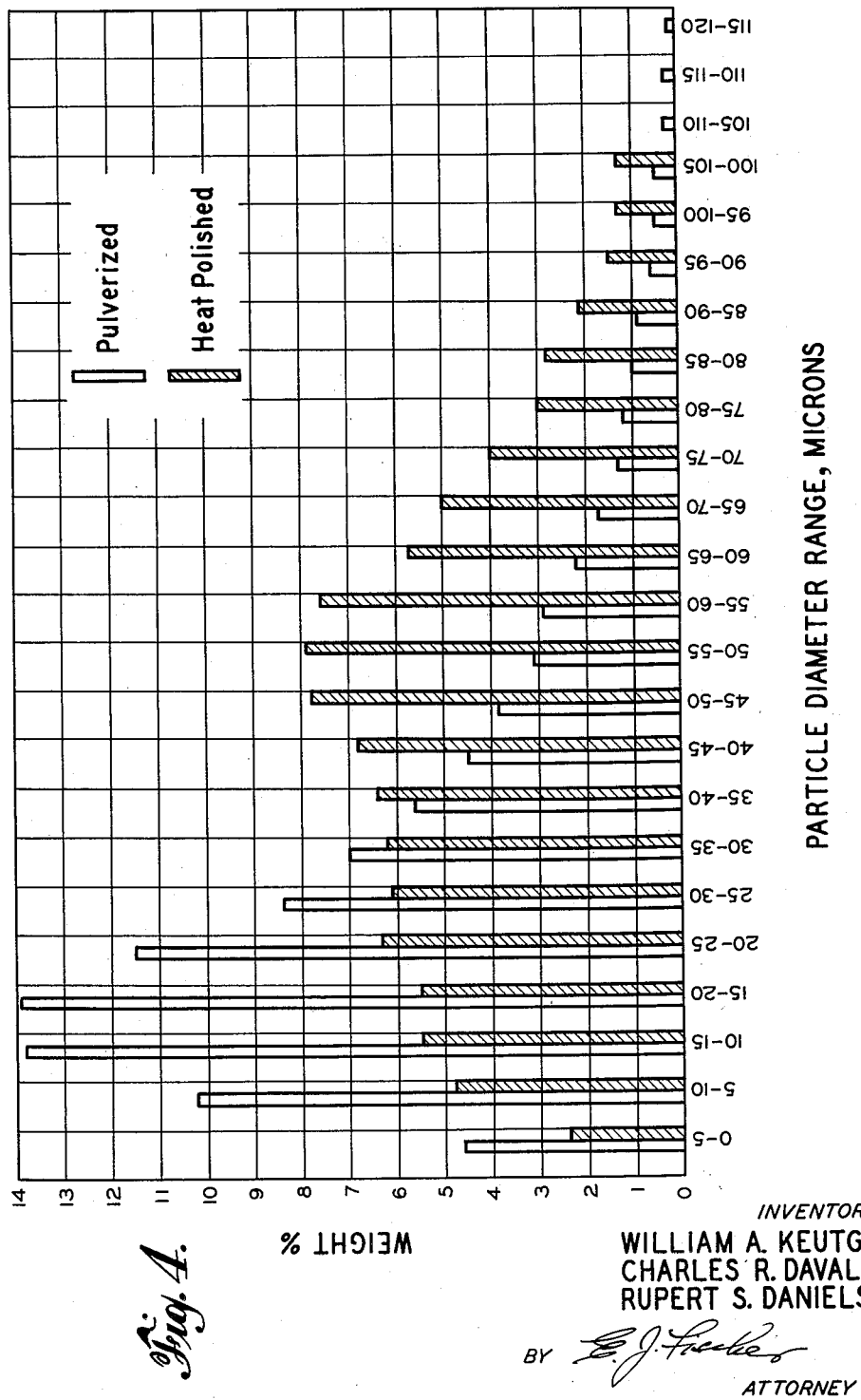
Fig. 4 is a comparison plot of the particle size distribution of the heat-polished resin microspheres of the present invention with a standard pulverized resin.

Fig. 4 is a graphic representation depicting particle size distribution as indicated by the diameter size thereof, for the heat polished microspheres of this invention as illustrated in Fig. 2 and that of the standard pulverized resin particles such as are shown in Fig. 3. The uniformity in size of the heat polished resin relative to that for the standard pulverized resin hitherto employed is readily evident.

If it is desired to completely cool the processed microspheres they may be picked up in a cold air stream at the bottom of the first cyclone separator and carried to a second cyclone for collection.

Thermocouples are preferably employed to measure the temperature of the hot air stream as it enters the chamber 1 and the temperature of the air stream leaving the said chamber, and drawn therefrom by the blower system described above. In a preferred method of practicing the present invention the volume of cold air entering the chamber through the compressed air lines 9 is equal to the volume of hot air entering the mixing chamber from the furnace.

The invention is illustrated in greater detail in the following examples:

EXAMPLE 1

A mixing chamber and accessory equipment similar to that shown in Fig. 1 and described hereinabove was used.

The chamber diameter was 3.8 feet, the height of the cylindrical portion was 3.3 feet and the conical section tapered down to a diameter of 4 inches over a height of 3.3 feet. This chamber was fitted with a ¼ inch diameter opening in the center of the top through which pulverized resin was fed. The cool air introduced in the resin conveyor tube and in the mixing chamber is maintained at 50°–60° F., and drawn through the system together with the hot air by a blower operating at a capacity of 280 ft.³/min. at a temperature of 380° F. Cold air was fed into the chamber through the compressed air line at a rate sufficient to reduce the outlet air to a temperature of 170° F., a point just below the melting point of the resin. Under these conditions the volume of cold air entering the chamber through the compressed air line and the resin conveyor tube was equal to the volume of hot air entering the chamber from the furnace. With the temperatures stabilized, pulverized resin was fed to the chamber at the rate of 50 grams/min. A typical screen analysis for the pulverized feed resin was 0 percent retained on 40 mesh, 1 percent retained on 100 mesh, 3 percent retained on 200 mesh and 15 percent retained on 325 mesh, the remainder in each case passing through.

The mesh sizes referred to throughout this specification accord with the accepted standards in this regard and are as follows:

*Table I*

| U.S. Sieve Sizes Sieve No. (Mesh) | Diameter of Sieve Opening in microns |
|---|---|
| 20 | 840 |
| 30 | 590 |
| 40 | 420 |
| 50 | 297 |
| 60 | 250 |
| 70 | 210 |
| 80 | 177 |
| 100 | 149 |
| 120 | 125 |
| 140 | 105 |
| 170 | 88 |
| 200 | 74 |
| 230 | 62 |
| 270 | 53 |
| 325 | 44 |

The particular phenol-aldehyde resin used in the above described example was a novolak resin prepared as follows:

A mixture of 100 parts of phenol and 72 parts of aqueous formaldehyde (37 percent) was heated to 55° C. and sufficient oxalic acid added to give a pH of 0.05–1.15. The mixture is reacted under vacuum reflux at 80° C. until it is cloudy. The temperature is then increased to 120° C. and the reaction continued under pressure of about 15 lbs. for about two hours. The reaction mixture is then dehydrated at atmospheric pressure to a residue temperature of 160° C. and then under reduced pressure until a sample of the resin has a melting point of about 95°–105° C.

The physical properties of the novolak microspheres compared to the novolak resin used in their preparation are as follows:

*Table II*

|  | Microspheres | Novolak Resin |
|---|---|---|
| Plate Flow, mm.[1] | 35 | 33 |
| Gel at 150° C. in seconds [1] | 81 | 81 |
| Screen analysis: |  |  |
| Percent on 40 mesh | 0 | 0 |
| Percent on 100 mesh | 0.13 | 1.0 |
| Percent on 200 mesh | 5.3 | 3.0 |
| Bulk Density, g./° C. | 0.59 | 0.39 |
| Surface Area, sq. meters/gm | 0.2 | 0.7 |

[1] Both microspheres and resins were blended with 10 percent by weight hexamethylene tetramine to measure these properties.

EXAMPLE 2

A resole resin was heat polished according to the process of Example 1, except that the temperature at the exit from the mixing chamber was maintained at 180° F.

The particular resole resin employed was prepared by reacting 100 parts phenol, 90.4 parts formalin (37 percent formaldehyde) and 5.6 parts hexamethylenetetramine under reduced pressure (17″ vacuum) at a temperature of 70° to 80° C. for about one hour. The reaction mixture is then dehydrated under reduced pressure (26–26.5″ vacuum) to a residue temperature of 75° C. The resulting product is a brittle grindable resin.

The physical properties of the resole microspheres compared to the powdered resole resin used in their preparation are as follows:

*Table III*

|  | Microspheres | Resole Resin |
|---|---|---|
| Contraction Point, ° C | 85 | 84 |
| Gel Time at 150° C., Sec | 41 | 43 |
| Screen Analysis: |  |  |
| Percent on 100 mesh | 28.40 | 29.23 |
| Percent on 200 mesh | 57.64 | 55.58 |

The time/temperature treatment to which the resin is subjected in this process does not cause any appreciable advancement of a heat reactive material since the resin is only subjected to a temperature slightly above its melting point for a maximum of 5 to 7 sec. The rate at which resin can be processed is naturally dependent on the size of the equipment which is used, and the rate of air flow through it.

The following experiment illustrates the usefulness of these materials as resin bonds for abrasive articles.

EXPERIMENT 1

Coarse grain abrasive structures were prepared using 88 parts of an equal mixture of No. 12, No. 14 and No. 16 aluminum oxide abrasive grain (see Table I, U.S. Dept. of Commerce Bulletin 118–50). The abrasive grain was first mixed with a quantity of liquid phenol-formaldehyde resin. A typical liquid phenol-formaldehyde resin is one prepared from equal molar quantities of phenol and paraform and reacted with an alkaline catalyst such as sodium hydroxide to a viscosity of approximately 300–400 cps. After thorough mixing, the resin wetted grains were mixed with a quantity of phenol-formaldehyde resin in the form of microspheres prepared as described above containing about 9 percent by weight of hexamethylene tetramine. The abrasive mixtures were then cold molded into test bars under a pressure of 1000 to 10,000 p.s.i. and then baked according to the following representative schedule:

*Table IV*

Temperature, ° F.:
```
80 to 175 _____minutes__ 20
175 to 195 _____hours__  2
At 195 _____do____ 12
195 to 215 _____do____  2
At 215 _____do____  3
215 to 245 _____do____  3
At 245 _____do____  3
245 to 285 _____do____  4
At 285 _____do____  2
285 to 365 _____do____  8
At 365 _____do____  9
```

These bars, when tested for tensile strength, gave the results recorded in Table V. For comparison, test bars were prepared using a quantity of the same liquid phenol-formaldehyde resin and a quantity of the same powdered phenol-formaldehyde resin which was used in preparing the resin microspheres.

Table V

| Sample No. | Percent Liquid Resin | Percent Powdered Resin | Percent Micro-Spheres | Tensile Strength, lbs./sq. in. at 25° C. |
|---|---|---|---|---|
| 1 | 2.6 | 9.4 | | 1,171 |
| 2 | 2.6 | | 9.4 | 1,658 |
| 3 | 2.0 | | 10.0 | 1,694 |
| 4 | 1.3 | | 10.7 | 1,628 |

It is evident from Samples 1 and 2 that using the resin microspheres and an amount of liquid resin which is normally used in combination with pulverized resin, abrasive structures of superior strength are obtained. Further, the abrasive resin microspheres' mix of Sample 2 was sticky, wet and difficult to distribute uniformly in the mold as compared to the abrasive pulverized resin mix of Sample 1. Surprisingly, however, as shown in Sample 3 wherein the liquid resin is reduced to yield a more free-flowing mix, the tensile strength was not affected. Moreover, when the amount of liquid resin was reduced as in Sample 4 to yield an abrasive microsphere resin mix having better flow and processing characteristics than the abrasive-pulverized resin mix of Sample 1 the increased tensile strength was maintained. This increased strength is indicative of a structure having substantially fewer internal voids and blisters than structures prepared with powdered resin.

That lesser amounts of wetting agents can be employed with the resin microspheres to obtain free flowing mixes from which the solid resin does not separate, is illustrated also by the following experiment.

EXPERIMENT 2

An abrasive mix was prepared using the following formulation:

830 gms. of an equal mixture of Nos. 12, 14 and 16 aluminum oxide abrasive grain
60 gms. sodium aluminum fluoride ($3NaF \cdot AlF_3$)
18 gms. liquid phenol-formaldehyde resin
92 gms. resin microspheres 1000 gms. total The resultant mix was placed in a 60 mesh screen and vibrated for three minutes. The residue left on the screen weighed 991 grams. Thus there was a loss of 9 grams.

The above test was repeated, but substituting a standard ground pulverized resin for the microspheres. The residue left on the screen weighed 925 grams or a loss of 75 grams, more than 8 times that accruing when the microspheres were used.

Thus it is apparent that when using microspheres, less liquid resin is required in order to prepare coherent, uniform, free-flowing abrasive mixes from which resin does not separate when mechanically handled in the process of producing abrasive structures. This is important since operations in the production of abrasive structures are often on a continuous basis, wherein the abrasive mixes are subjected to considerable handling. Abrasive mixes which do not withstand this handling are therefore unacceptable. On the other hand the more liquid resin (about twice as much) which is required to prepare coherent, uniform, free-flowing mixes from which resin does not separate when mechanically handled yields abrasive structures which are lower in tensile strength as shown in Table I.

The advantage of using the lesser amounts of liquid resin is further evident where an abrasive structure prepared from pulverized resin and the normal amount of liquid resin for this type of abrasive structure and an abrasive structure prepared from microspheres and one half the normal amount of liquid resin used in an abrasive structure prepared from pulverized resin were cold pressed in a cylindrical mold and then placed on a ceramic plate in an oven pre-heated to 285° F. and cured for four hours. It is evident that under such accelerated curing conditions the structure employing pulverized resin is completely distorted whereas one prepared from the resin microspheres of the present invention is substantially free of distortion. Consequently, the use of lesser amounts of wetting agents, which is possible when using microspheres, permits the use of shorter curing cycles, without increasing distortion of the abrasive structure.

While the foregoing illustrates the use of resin microspheres in the "cold press" method of making abrasive structures, their use is also advantageous in the "hot press" method. In this method the abrasive mixture is hot pressed at a temperature of 300° F. then given a short after bake of 2 to 12 hours at 300–400° F.

As an illustration of the better flow properties characterizing the heat polished resins of this invention, the following experiment was performed:

EXPERIMENT 3

A pulverized resin whose particle size distribution is approximately 12 percent on 100 mesh, 42 percent on 200 mesh and 64 percent on 325 mesh is placed in a glass funnel whose sides converge at an angle of 60° and whose bottom outlet is .422 inch in diameter. The resin will not flow from the funnel. If the funnel is vibrated, the resin will slowly flow from the bottom outlet, but the flow will immediately cease if the vibration is stopped. A heat polished resin with the same particle size distribution will flow readily from the bottom opening of such a funnel, however, without the need for vibration. In fact, the heat polished resin will also flow freely from a funnel with sides which converge at a 60° angle and whose bottom opening is only .156 inch in diameter.

It will be apparent to those skilled in the art that while we have disclosed the preferred embodiments of our invention and the preferred modes of carrying the same into effect, that many variations may be made therein without departing from the spirit thereof. Thus, for example, pulverized resin as coarse as 15 percent retained on 100 mesh, 40 percent retained on 200 mesh and 60 percent retained on 325 mesh has been processed, but a large chamber is preferable for such a material in order to completely melt the larger resin particles. Accordingly, the scope of this invention is not limited to the specific embodiments thereof except as defined in the appended claims.

We claim:

1. A process which comprises propelling and dispersing dry, ground, fusible heat-hardenable phenol-aldehyde resin particles by means of a cool, turbulent substantially inert gas feed functioning at a temperature substantially below the melting point of the said resin into a mixing chamber at one end thereof and at which point therein the said particles are entrained in a hot turbulent substantially inert gas stream the temperature of which is above the melting point of the resin and heat polished to form spheres the heat and time of entrainment being insufficient to cause appreciable advancement of the resin, said spheres passing to the periphery and opposite end of said chamber wherein a counterrotating cool, turbulent, substantially inert gas of a temperature substantially below the point of melting of said resin is again supplied to said chamber and entraining and cooling said spheres therein to form fusible, rounded microspheres.

2. A process which comprises propelling and dispersing dry, ground heat-hardenable, novolak resin particles at a controlled rate of feed by means of a turbulent substantially inert gas feed, functioning at a temperature of 20° F. to 30° F. below the point of melting of the said resin particles into a mixing chamber at the top central portion thereof and at which point therein the said particles are entrained in a hot, turbulent substantially inert gas stream of approximately 380° Fahrenheit and heat polished to form spheres the heat and time of entrainment being insufficient to cause appreciable advancement of the resin, at least 90 percent of which have a diameter of 15 to 200 microns, said spheres passing to the periphery and opposite end of said chamber wherein a counterrotating cool, turbulent substantially inert gas at a temperature of 20° F. to 30° F. below the melting point of said spheres is supplied to said chamber and cooling said spheres therein to form fusible, rounded microspheres, and withdrawing said microspheres and said hot and cool gases through a common port of said mixing chamber at a temperature of no more than 170° Fahrenheit.

3. A process which comprises propelling and dispersing dry, ground heat-hardenable, resole resin particles at a controlled rate of feed by means of a turbulent substantially inert gas feed, functioning at a temperature of 20° F. to 30° F. below the melting point of said resin particles into a mixing chamber at the top central portion thereof and at which point therein the said particles are entrained in a hot turbulent substantially inert gas stream of approximately 380° Fahrenheit and heat polished to form spheres the heat and time of entrainment being insufficient to cause appreciable advancement of the resin, at least 90 percent of which have a diameter of 15 to 200 microns, said spheres passing to the periphery and opposite end of said chamber wherein a counterrotating cool, turbulent substantially inert gas at a temperature of 20° F. to 30° F. below the point of melting of said spheres is supplied to said chamber and cooling said spheres therein to form fusible, rounded microspheres, and withdrawing said microspheres and said hot and cool gases through a common port of said mixing chamber at a temperature of no more than 180° Fahrenheit.

4. A process which comprises propelling and dispersing dry, ground particles of a fusible heat-hardenable phenol-aldehyde condensation product of 2 to 200 microns in diameter received from a vibratory feed trough at a controlled rate of speed by means of a cool, turbulent substantially inert feed functioning at a temperature substantially below the point of melting of the said resin into a mixing chamber at one end thereof and at which point therein the said particles are entrained in a hot turbulent substantially inert gas stream the temperature of which is above the point of melting of the resin and heat polished to form spheres the heat and time of entrainment being insufficient to cause appreciable advancement of the resin, said spheres passing to the periphery and opposite end of said chamber wherein a counterrotating cool, turbulent substantially inert gas of a temperature substantially below the point of melting of said resin is again supplied to said chamber and entraining and cooling said spheres therein to form fusible, rounded microspheres.

5. Phenol-aldehyde resin microspheres formed by propelling and dispersing dry, ground, fusible heat-hardenable phenol-aldehyde resin particles by means of a cool, turbulent substantially inert gas feed functioning at a temperature substantially below the melting point of the said resin into a mixing chamber at one end thereof and at which point therein the said particles are entrained in a hot turbulent substantially inert gas stream the temperature of which is above the melting point of the resin and heat polished to form spheres the heat and time of entrainment being insufficient to cause appreciable advancement of the resin, said spheres passing to the periphery and opposite end of said chamber wherein a counterrotating cool, turbulent, substantially inert gas of a temperature substantially below the point of melting of said resin is again supplied to said chamber and entraining and cooling said spheres therein to form fusible, rounded microspheres.

6. Phenol-aldehyde novolak resin microspheres formed by propelling and dispersing dry, ground heat-hardenable, novolak resin particles at a controlled rate of feed by means of a turbulent substantially inert gas feed, functioning at a temperature of 20° F. to 30° F. below the point of melting of the said resin particles into a mixing chamber at the top central portion thereof and at which point therein the said particles are entrained in a hot, turbulent substantially inert gas stream of approximately 380° Fahrenheit and heat polished to form spheres the heat and time of entrainment being insufficient to cause appreciable advancement of the resin, at least 90 percent of the spheres having a diameter of 15 to 200 microns, said spheres passing to the periphery and opposite end of said chamber wherein a counterrotating cool, turbulent substantially inert gas at a temperature of 20° F. to 30° F. below the melting point of said spheres is supplied to said chamber and cooling said spheres therein to form fusible, rounded microspheres, and withdrawing said microspheres and said hot and cool gases through a common port of said mixing chamber at a temperature of no more than 170° Fahrenheit.

7. Phenol-aldehyde resin microspheres formed by propelling and dispersing dry, ground heat-hardenable resole resin particles at a controlled rate of feed by means of a turbulent substantially inert gas feed, functioning at a temperature of 20° F. to 30° F. below the melting point of said resin particles into a mixing chamber at the top central portion thereof and at which point therein the said particles are entrained in a hot turbulent substantially inert gas stream of approximately 380° Fahrenheit and heat polished to form spheres the heat and time of entrainment being insufficient to cause appreciable advancement of the resin, at least 90 percent of the spheres having a diameter of 15 to 200 microns, said spheres passing to the periphery and opposite end of said chamber wherein a counterrotating cool, turbulent substantially inert gas at a temperature of 20° F. to 30° F. below the point of melting of said spheres is supplied to said chamber and cooling said spheres therein to form fusible, rounded microspheres, and withdrawing said microspheres and said hot and cool gases through a common port of said mixing chamber at a temperature of no more than 180° Fahrenheit.

8. Product according to claim 6 containing a methylene engendering agent in amount imparting heat-hardenability to the novolak microspheres.

References Cited in the file of this patent

UNITED STATES PATENTS

| | | |
|---|---|---|
| 2,038,251 | Vogt | Apr. 21, 1936 |
| 2,101,635 | Bender | Dec. 7, 1937 |
| 2,334,578 | Potters | Nov. 16, 1943 |
| 2,431,884 | Neuschatz | Dec. 2, 1947 |
| 2,437,263 | Manning | Mar. 9, 1948 |
| 2,745,141 | Brennan | May 15, 1956 |
| 2,838,881 | Plumat | June 17, 1958 |